G. S. SALSBURY.
Hop-Frame.
No. 57,777.
Patented Sept. 4, 1866.
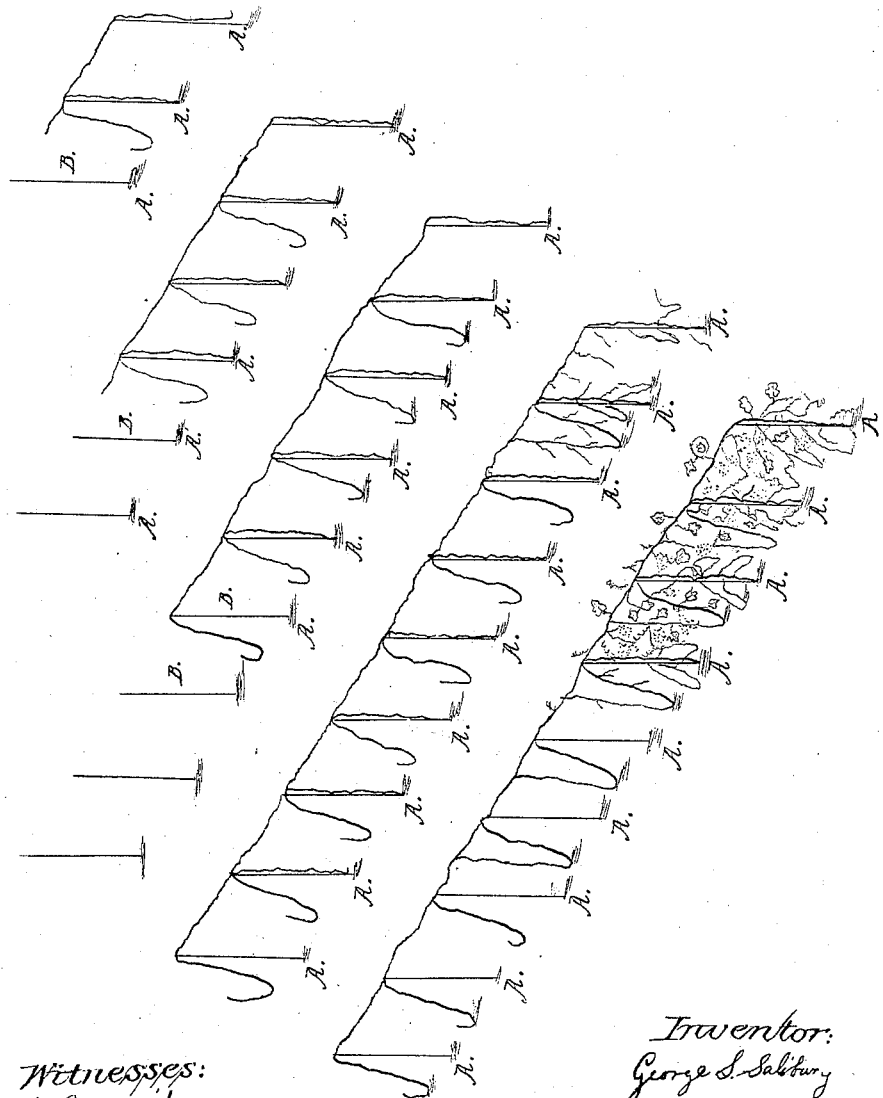
Witnesses:
D. N. Pettengill
Walter Pettengill
Inventor:
George S. Salsbury

UNITED STATES PATENT OFFICE.

GEORGE S. SALSBURY, OF CLARENDON, NEW YORK.

IMPROVEMENT IN TRAINING GRAPE-VINES.

Specification forming part of Letters Patent No. 57,777, dated September 4, 1866.

*To all whom it may concern:*

Be it known that I, GEORGE S. SALSBURY, of Clarendon, in the county of Orleans, in the State of New York, have discovered a new and useful application of a principle to the cultivation of the grape-vine for the purpose of making them self-sustaining; and I do hereby declare that the following is a full and exact description thereof, reference being had to the accompanying drawing, and to the letters of reference marked thereon.

The nature of my discovery consists in the peculiar manner of planting and training the vines.

To enable others skilled in agriculture to adopt and use my discovery or invention, I will proceed to describe its arrangement and operation.

I lay out my ground for a vineyard in straight lines or rows about four feet apart one way, and about eight feet apart the other way. (See drawing at A A A A, &c.) At A, I plant or set my vines. At each vine I drive down a small temporary stake, from three to five feet high, as shown at B in the drawing. I train the young vine up the stakes to the top, and from the lateral vines below the top of the stake I select my braces—two, three, or more, as the case may seem to require, as shown at C in the drawings. These braces I turn down and head them in the ground, turning the point up, so as to train it back to the main stock, which forms a double brace. These braces may be as many or few as may suit the vine-dresser, and in any direction to suit the fancy and best to accomplish the object. From the top of the stake I turn the main stock over to the next stake, resting it on the top, and bringing it down midway between the stakes, and there heel or plant it again in the ground. These main stalks or vines, when so arranged, will entwine themselves so firmly to their neighbors as to form a kind of hand-rail or natural trellis, as shown in the drawing, and by the time the first stakes have decayed will have attained a sufficient strength to be self-supporting.

This kind of training will be sufficiently understood by the foregoing description and drawings; but it will be remembered that there are a great variety of grapes, and some are much more rapid growers than others, and the number of laterals to be used for braces would depend very much on the kind of grape and rapidity of growth; but to any expert in the business the principle is sufficiently explained. His taste and judgment must supply how many and in what direction the laterals should be taken to be the most useful as well as most ornamental.

It is quite perceiveable that when the natural trellis is sufficiently formed by age and strength of vine, the row or trellis becomes a good fence, for which purpose the grape-vine, when trained upon my principle, may be used successfully.

What I claim as my discovery or invention, and wish to secure by Letters Patent of the United States, is—

The peculiar manner of training and trimming the grape-vine so as to make it self-sustaining, forming its own trellis, substantially as set forth, claiming the described method in its broadest sense.

GEORGE S. SALSBURY.

Witnesses:
   D. N. PETTENGILL,
   WALTER PETTENGILL.